United States Patent [19]

Baile

[11] 4,239,632
[45] Dec. 16, 1980

[54] LUBRICANT COMPOSITION

[75] Inventor: George H. Baile, Beach Haven, N.J.

[73] Assignee: SKF Industries, Inc., King of Prussia, Pa.

[21] Appl. No.: 20,433

[22] Filed: Mar. 14, 1979

[51] Int. Cl.$^3$ .................... C10M 5/00; C10M 7/00
[52] U.S. Cl. ................................ 252/12; 252/25; 252/26; 585/10; 585/13
[58] Field of Search .............. 252/12, 25, 26; 585/10, 585/13

[56] References Cited

U.S. PATENT DOCUMENTS

| | | | |
|---|---|---|---|
| 3,076,764 | 2/1963 | Hansen et al. | 585/13 |
| 3,541,011 | 11/1970 | Davis et al. | 252/12 |
| 3,547,819 | 12/1970 | Davis et al. | 252/12 |
| 3,600,309 | 8/1971 | Loser et al. | 252/12 |
| 3,729,415 | 4/1973 | Davis et al. | 252/25 |
| 3,779,918 | 12/1973 | Ikeda et al. | 252/12 X |
| 3,919,098 | 11/1975 | Altgelt | 585/10 |
| 4,146,487 | 3/1979 | Rumierz | 252/12 |

FOREIGN PATENT DOCUMENTS

| | | | |
|---|---|---|---|
| 293043 | 3/1971 | U.S.S.R. | 252/26 |
| 304056 | 7/1971 | U.S.S.R. | 252/26 |

*Primary Examiner*—Helen M. S. Sneed
*Attorney, Agent, or Firm*—Eugene E. Renz, Jr.

[57] ABSTRACT

Lubricating compositions and shaped articles composed thereof are described which consist essentially of about 30 to about 60% by weight of an oil of lubricating viscosity, about 20 to about 50% by weight of a high molecular weight polymer, and about 20 to about 50% by weight of a heat conductive agent capable of conducting heat away from a bearing surface where it is generated. The high molecular weight polymer may, for example, be polyethylene, having average molecular weights in the range from about $1.0 \times 10^5$ to about $5.0 \times 10^6$. The oil may be a mineral oil, a diester oil or preferably a synthetic hydrocarbon oil having a viscosity in the range from about 13 to about 1200 millimeters$^2$/sec (mm$^2$/s) at 38° C. (100° F.) The heat conductive agent may be powdered zinc oxide, aluminum powder, or equivalents thereof in this invention. The compositions are semi-rigid gels which may be formed in a mold and used as is, or which may be shaped further after molding. The gels are formed by blending the heat conductive agent and polymer and then blending that mixture with the oil and heating to a temperature above the softening temperature of the polymer for a period of time (about 5 to about 75 minutes) sufficient that the mixture will form a firm, tough, solid gel on cooling having an oily surface provided by oil exuding from the gel thus producing a lubricative mass operable for extended periods of time. The heat conductive substance dispersed in the gel aids in dissipating heat produced at the bearing surfaces during use thus improving the performance of the gel both in withstanding higher bulk operating temperatures and in resisting breakdown of the gel under prolonged use.

11 Claims, No Drawings

LUBRICANT COMPOSITION

BACKGROUND OF THE INVENTION

It has long been recognized that it would be desirable in many industries and arts to provide a lubricating product or article which would be capable of releasing lubricant over a prolonged period of time under a wide variety of operating conditions and particularly at elevated temperatures and speeds. For example, self-lubricating bearings are of great value in the automotive, aviation and other industries. It has also been recognized that it would be highly desirable for such lubricants to be self-supporting, i.e. to have sufficient inherent mechanical strength to actually constitute or at least form a part of the lubricating structure. Therefore, it has been apparent that shaped lubricating articles, composed of a semi-rigid, self-supporting composition, and capable of prolonged use at elevated temperatures and speeds, would be highly desirable.

THE PRIOR ART

Self-supporting lubricating compositions and articles and methods for producing them have been described in the prior art. For example, Davis and Gilles U.S. Pat. Nos.: 3,729,415, issued Apr. 23, 1973; 3,547,819, issued Dec. 15, 1970; and 3,541,011, issued Nov. 17, 1970; all disclose lubricating compositions comprising a hydrocarbon oil and polyethylene in various forms, including self-supporting gels which exude oil and thus have an oily lubricating surface. British Pat. No. 1,173,123 published Sept. 4, 1960, is based on the foregoing Davis and Gilles U.S. Patents, but suggests that polybutylene may be used in such compositions, although all of the working examples actually employ only polyethylene.

Agens U.S. Pat. No. 3,135,564, issued June 2, 1964, discloses an anti-friction bearing and a method of making it which contains a formed-in-place, unitary, solid, plastisol containing a lubricant completely filling an annular space to provide lubrication.

Scott and Swartz U.S. Pat. No. 3,913,992, issued Oct. 21, 1975, discloses a method and apparatus employing a mass of grease placed on a dispensing surface on a rotating member in such a way that the centrifugal force of the grease against the dispensing surface causes oil to be released from the grease under use conditions.

It will be seen from the foregoing that self-supporting lubricating compositions and articles such as bearings containing them have been developed previously. However, the existing compositions of this type have been found to be useful only at operating temperatures no higher than about 105° C. (221° F.) since they become tacky, lose their lubricity and are discharged leaving a dry bearing at temperatures of 110° C. (230° F.) or higher.

While the semi-rigid gel self-supporting lubricating structures provided by the foregoing prior art have proven successful commercially, it has been found that for such compositions containing a high molecular weight polymer of any given average molecular weight, the conditions under which roller bearings may be operated with such lubricants are limited to certain maximum temperatures and speeds. When such temperatures or speeds are exceeded, the lubricants fail and are expelled from the bearing. It has been recognized, therefore, that it would be desirable to improve such lubricants and articles by increasing the temperatures and speeds of rotation under which they remain operable.

It is, therefore, a primary object of the present invention to provide improved lubricating compositions and shaped articles composed thereof which are self-supporting and capable of prolonged operation at operating temperatures and speeds substantially in excess of those at which comparable lubricants of the prior art would break down.

It is another object of the invention to provide novel lubricating compositions and articles which are capable of dissipating heat generated at a bearing surface to thus prevent breakdown of the lubricant and provide prolonged operation at higher temperatures and speeds than would be possible otherwise.

It is still another object of the invention to provide shaped lubricating articles composed of a semi-rigid gel formed from a lubricating oil of lubricating viscosity and a high molecular weight polymer, whereby oil exudes from the surface of said articles during use, and which also contains a heat conducting substance which dissipates heat generated at the bearing surface.

SUMMARY OF THE INVENTION

The foregoing and other objects of the invention which will become apparent hereinafter are attained by improving the semi-rigid oil-high molecular weight polymer lubricating gels and articles of the prior art by incorporating therein, a dispersed heat conductive agent which serves to dissipate heat generated at a bearing surface, thus permitting any given lubricant of this type to be used at higher temperatures and operating speeds than would otherwise be possible.

More specifically, lubricating compositions and shaped lubricating articles which exude oil during use are provided which consist essentially of about 30 to about 60% by weight of an oil of lubricating viscosity, about 20 to about 50% by weight of a high molecular weight polymer, and about 20 to about 50% by weight of a heat conductive agent capable of conducting heat away from a bearing surface lubricated by the composition or article. The semi-rigid gels are formed as taught in the Davis and Gilles U.S. Pat. Nos. 3,729,415; 3,547,819; and 3,541,011 and British Pat. No. 1,173,123 referred to above. In the present invention, however, about 20 to about 50% of a finely divided heat conductive agent based on the weight of the total composition, is blended with the high molecular weight polymer before it is blended with the lubricating oil and cured to form the final semi-rigid gel.

The preferred compositions of the invention are made from synthetic hydrocarbon oils having a viscosity in the range from about 13 to about 260 mm$^2$/s measured at a temperature of 38° C. (100° F.). Other known lubricating oils of comparable viscosity may also be employed including the diester oils described in Military Specifications MIL-L-23699B and MIL-L-7808G. These refer to aircraft turbine engine lubricants. Products qualified under these specifications include; respectively, Exxon ETO 2380 and Exxon ETO 2389. Naturally occurring mineral oils may also be employed, but less desirably, since they tend to deteriorate at the high temperatures employed in the preparation of the new lubricating compositions. Especially preferred compositions are obtained from synthetic hydrocarbon oils having a viscosity in the range from about 25 to about 170 mm$^2$/s.

The polymeric component of the new compositions may be any of the high molecular weight polymers of the Davis and Gilles Patents referred to above, i.e. a polyolefin having an average molecular weight in the range from about $1.0 \times 10^5$ to about $5.0 \times 10^6$, the preferred polymer being a polyethylene of average molecular weight in the range from about $2.0 \times 10^5$ to about $4.0 \times 10^6$. However, only minor proportions of polyethylene having a molecular weight of the order of $1.0 \times 10^5$ to $1.0 \times 10^6$ may be employed. Another useful high molecular weight polymer is polymethylpentene having an average molecular weight in the range from about 3 to about 5 million; PMP having an average molecular weight of about 5 million having been found to provide excellent results by my co-worker John R. Rumierz in his co-pending U.S. Pat. No. 4,146,487.

The heat conductive agents employed in the new compositions are those which are capable of conducting heat away from a bearing surface in contact with the new lubricants or lubricating articles when such agents are dispersed therein in amounts about 20 to about 50% by weight of the total composition. The preferred heat conductive agents are zinc oxide and aluminum metal, each in finely divided form. The particle size of the aluminum may vary from about 5 to about 20 microns whereas the particle size of the zinc oxide suitably may be about 3 to 4 microns.

The compositions are prepared by first blending the high molecular weight polymer and heat conductive agent according to conventional blending procedures. The semi-rigid gels are then prepared by simply blending the polymer-heat conductive agent mixture with the oil in a conventional blender to form a physical mixture. This mixture may contain about 30 to 60% oil, about 20 to 50% polymer and about 20 to 50% heat conductive agent, all by weight of the total composition.

The resulting physical mixture is then introduced to a mold and cured by heating it to a temperature in the range from about 325 to about 375° F. The exact temperature being selected depending on the liquid phase used. This curing temperature is maintained for a period of time (about 5 to about 75 minutes) sufficient until the mixture becomes sticky. This end point may be determined visually, by trial and error, or by testing the mixture with a metal rod to which the mixture will adhere when properly cured. The final product is then obtained by allowing the cured mixture to cool whereupon it forms a firm, tough, solid gel conforming in shape to the mold. The resulting shaped article may be shaped further by conventional means to fit any desired bearing cavity so as to assure contact of the lubricating article with the surface to be lubricated. Articles formed in this way have an oily surface provided by the exudation of oil from the semi-rigid gel.

It is preferred in the present invention, to mold and otherwise shape the articles in situ so as to make them better conform to the bearing cavity. Failure to completely fill a complex bearing cavity often results in undersized or incomplete lubricating articles when they are not formed in situ in the bearing, thus failing to provide full lubricating contact with the surfaces to be lubricated. Therefore, to ensure complete filling of the air-space in a bearing cavity it is preferred to mold in situ. This is particularly critical in those cases where the bearing cavity has relatively thin cross section air spaces, since thin gel structures between the rolling elements and races tend to overheat in use and reach temperatures exceeding the softening temperature of the semi-rigid gel. When this occurs, the gels break down and are expelled from the bearing with consequent failure of lubrication. However, with the semi-rigid gel compositions and articles of the present invention, which contain from about 20 to about 50% by weight of a heat conductive agent evenly dispersed throughout the gel, a gel containing any given polymer, is able to withstand a substantially higher bulk temperature and/or operating speed under in use conditions, without softening and break down, due to the dispersal of heat generated at the bearing surface, by means of the heat conductive agent. More specifically, polyethylene-containing gels which would normally soften and fail at about 102° to 104° C. (215° to 220° F.) by becoming sticky and being expelled to leave a dry bearing, are operable at temperatures of about 105° to 160° C. (220° to about 320° F.) due to the content of heat conductive agent. It will be apparent to those skilled in the art, therefore, that the new heat conductive agent-containing semi-rigid gel lubricants and articles constitute a distinct improvement over the prior art for use at operating temperatures above about 93° C. (200° F.).

The physical characteristics of the gels and articles of the present invention vary somewhat depending upon the identity and average molecular weight of the polymer and the proportion of polymer in the gel. Increasing the molecular weight and concentration of the polymer in the composition increases the firmness, toughness and rigidity of the gel. These characteristics are correspondingly decreased by decreasing the molecular weight and concentration of polymer in the composition. It will be seen, therefore, that by varying the molecular weight and concentration of the polymer, lubricating compositions and articles can be produced which are especially adapted for use in particular applications.

DETAILED DESCRIPTION OF THE INVENTION

EXAMPLE I

In order to illustrate the operating characteristics of the semi-rigid oil-polymer gel lubricants of the prior art, Davis and Gilles U.S. Patents referred to above, eight ball bearings were provided with in situ gelled polyethylene-lubricating oil semi-rigid lubricating masses made according to those patents. These ball bearings and the contained lubricating masses were life-tested on Barwell type machines modified to permit testing of the SKF 6205 size deep groove ball bearings. In all cases a load of 190 lbs was applied in the thrust direction and the bearings were run at 3600 rpm. Two of the eight bearings were run for 65 hours and then stopped only because the test apparatus was needed for other work. The other bearings failed after 0.1, 0.2, <0.1, 3, 9 and 122 hours, respectively. The average life of these bearings including the two that were suspended before failure was 33 hours. While some of the eight bearings had substantial life in use, the fact that others broke down very quickly, shows that the conventional gelled lubricant was not satisfactory for this service.

EXAMPLE II

A second series of tests were run under the same conditions as Example I employing four identical bearings containing the same polyethylene-lubricating oil semi-rigid gel except that 20% by weight of zinc oxide powder, based on the weight of the total composition, had been blended with the polyethylene before making the lubricant mass. When these bearings were tested as before under 190 lb. load at 3600 rpm, they were run for 593, 146, 19 and 186 hours respectively, without failure. This represents an average life of 236 hours, but more importantly shows that such zinc oxide loaded bearings have the capability of providing extended operating life without failure.

EXAMPLE III

Another series of tests was run under the same conditions as Examples I and II using five of the same bearings filled with the same basic polyethylene-lubricating oil gel except that 22% by weight of aluminum powder had been mixed with the polyethylene prior to formation of the semi-rigid lubricating mass. These bearings were run as before under the same load and speed conditions. The tests were suspended after 48, 147, 72, 167 and 240 hours respectively, for the five bearings, without failure of any of the bearings. Therefore, the added aluminum powder provided the capability of an average of at least 135 hours of service without failure.

What is claimed is:

1. In a lubricating composition for prolonged use in contact with a bearing surface at elevated operating temperatures, said composition having a matrix consisting essentially of about 20 to about 50% of a polymer selected from the group consisting of polyethylene and polymethylpentene, said polymer having an average molecular weight in the range from about 1 to about 5 million, said matrix being in the form of a firm, tough, solid gel containing about 50 to about 60% of an oil of lubricating viscosity uniformly distributed therethrough whereby said composition has an oily surface due to the exudation of oil from said matrix, the improvement which comprises:

about 20 to about 50% of a heat conductive agent incorporated in said composition, whereby said heat conductive agent dissipates heat produced at a bearing surface in contact with said lubricating composition under operating conditions thereby improving the performance of said lubricating composition in withstanding elevated operating temperatures and in resisting breakdown of the gel matrix under prolonged use or elevated temperature, said percentages being by weight of the entire composition.

2. A composition of claim 1 wherein the heat conductive agent is selected from the group consisting of finely divided zinc oxide and aluminum.

3. A composition of claim 2 wherein the oil is selected from the group consisting of mineral oil, diester oil and synthetic hydrocarbon oil.

4. A composition of claim 3 wherein the polymer is polyethylene.

5. A composition of claim 3 wherein the polymer is polymethylpentene.

6. A shaped article comprising a composition of claim 1, 2 or 3.

7. An article comprising a shaped mass of a lubricating composition of claim 1, 2 or 3.

8. A shaped article comprising a composition of claim 1 in which the polymer is polyethylene and the heat conductive agent is zinc oxide.

9. A shaped article comprising a composition of claim 1 in which the polymer is polyethylene and the heat conductive agent is aluminum.

10. A shaped article comprising a composition of claim 1 in which the polymer is polymethylpentene and the heat conductive agent is zinc oxide.

11. A shaped article comprising a composition of claim 1 in which the polymer is polymethylpentene and the heat conductive agent is aluminum.

* * * * *